(12) United States Patent
Kimura et al.

(10) Patent No.: US 10,997,452 B2
(45) Date of Patent: May 4, 2021

(54) INFORMATION PROCESSING APPARATUS AND NON-TRANSITORY COMPUTER READABLE MEDIUM STORING PROGRAM

(71) Applicant: FUJI XEROX CO., LTD., Tokyo (JP)

(72) Inventors: Shunichi Kimura, Kanagawa (JP);
Masanori Sekino, Kanagawa (JP);
Takuya Sakurai, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 120 days.

(21) Appl. No.: 16/521,549

(22) Filed: Jul. 24, 2019

(65) Prior Publication Data
US 2020/0242387 A1 Jul. 30, 2020

(30) Foreign Application Priority Data
Jan. 24, 2019 (JP) .............................. JP2019-010052

(51) Int. Cl.
*G06K 9/34* (2006.01)
*G06K 9/62* (2006.01)
*G06F 40/10* (2020.01)

(52) U.S. Cl.
CPC ............. *G06K 9/344* (2013.01); *G06F 40/10* (2020.01); *G06K 9/6201* (2013.01)

(58) Field of Classification Search
CPC ....... G06K 9/344; G06K 9/6201; G06F 40/10
See application file for complete search history.

(56) References Cited

U.S. PATENT DOCUMENTS

| 9,047,528 B1* | 6/2015 | Guha | G06K 9/342 |
| 2004/0032986 A1* | 2/2004 | Snapp | G06K 9/723 |
| | | | 382/217 |
| 2011/0268360 A1* | 11/2011 | Antonijevic | G06K 9/344 |
| | | | 382/177 |

(Continued)

FOREIGN PATENT DOCUMENTS

| JP | H11296619 | 10/1999 |
| JP | 2000082110 | 3/2000 |
| JP | 2012185713 | 9/2012 |

(Continued)

*Primary Examiner* — David F Dunphy
(74) *Attorney, Agent, or Firm* — JCIPRNET

(57) ABSTRACT

An information processing apparatus includes a first character recognition section that performs character recognition of an input image on an assumption that a character in the input image belongs to a first character type and outputs a first character recognition result being a result of the character recognition, a second character recognition section that performs character recognition of the input image on an assumption that the character in the input image belongs to a second character type and outputs a second character recognition section being a result of the character recognition, the second character type being a set obtained by adding at least one or more characters which do not belong to the first character type to a set of characters belonging to the first character type, and a matching section that performs matching of the first character recognition result with the second character recognition result, and, in a case where it is found that the first character recognition result does not match with the second character recognition result by the matching, rejects the first character recognition result.

5 Claims, 7 Drawing Sheets

(56) References Cited

U.S. PATENT DOCUMENTS

2013/0301920 A1* 11/2013 Venkatapathy .......... G06K 9/72
                                                    382/182
2015/0356365 A1* 12/2015 Collet ..................... G06K 9/344
                                                    382/177

FOREIGN PATENT DOCUMENTS

| JP | 2013073439 | 4/2013 |
| JP | 2013214188 | 10/2013 |
| JP | 2016212812 | 12/2016 |

* cited by examiner

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2019-010052 filed Jan. 24, 2019.

BACKGROUND

(i) Technical Field

The present invention relates to an information processing apparatus and a non-transitory computer readable medium storing a program.

(ii) Related Art

There is a data input system that digitizes a character string handwritten or printed on a paper business form. In the data input system, the character string in the business form is digitized by a method of causing a person to read the form and input a character string in the form with keys, a method of performing character recognition processing on an image in the form by a character recognizer using an optical character recognition (OCR) technology, and a combination thereof.

In an information processing apparatus disclosed in JP2016-212812A, a classification section classifies a character recognition target into any of three types, an extraction section extracts a character recognition result of the character recognition target in a case where the character recognition target is classified into a first type by the classification section, a first control section performs control to extract the character recognition result of the character recognition target and to manually input the character recognition result, in a case where the character recognition target is classified into a second type by the classification section, and a second control section performs control to cause a plurality of persons to manually input the character recognition target in a case where the character recognition target is classified into a third type by the classification section. JP2016-212812A discloses that a character recognition module outputs certainty (that is, degree of assuring that the character recognition result is correct) of the character recognition result, and thus classifies the character recognition target into the first to third types in accordance with the value of the certainty, and extracts the character recognition result as a final result in a case where the certainty is within the highest range.

In character recognition for an entry field such as a postal code field, in which a character type to be written is limited, a method using a character recognizer performing character recognition on the assumption that the written character belongs to the character type is performed.

For example, JP2013-214188A discloses a method in which designation of a character type is used from a user, a trace of the input handwritten character is compared to a plurality of characters registered in advance, in a range limited to the designated character type, and a registered character having high similarity to the trace of the handwritten character is extracted as a recognition candidate.

In a case where a character recognition result obtained by the character recognizer is determined to be incorrect, the character recognition result is rejected.

For example, JP2012-185713A discloses that a character recognition result of a character recognizer is rejected in a case where the reliability (corresponding to certainty) of the character recognizer in character recognition is low, or in a case where a strikethrough and the like are included in an image of a character.

JP2013-073439A discloses that the degree of deterioration of a character image is calculated for each type of deterioration, and it is determined whether or not a character recognition result for the character image is rejected, based on the calculated degree of deterioration.

With an attempt to reject the character recognition result, it is possible to perform measures for improving the accuracy, for example, urging a person to confirm the character recognition result or urging the person to scan or repeat the character recognition.

JP2000-082110 discloses a method of determining a final character recognition result by collectively evaluating character recognition results of a plurality of character recognition units having different recognition methods.

JP1999-296619A is also an example of the related art.

SUMMARY

Characters of another character type (for example, alphabet) may be written in an entry field in which a specific character type (for example, number) is to be written, by an error of a person. For example, in a case where the shape of the character which is erroneously written, as described above, is similar to the shape of a specific character of the specific character type to be originally written, a character recognition section may recognize the written character as the specific character. Although the result of this recognition is originally incorrect, the character recognition section often outputs the result of the recognition with high certainty.

In the method of rejecting a character recognition result in a case of a high probability of the character recognition result being incorrect, it may not be possible to properly reject the erroneous character recognition result of such a type. For example, in the method of rejecting a character recognition result in a case where the certainty of the character recognition result is low, the erroneous character recognition result of such a type is not rejected.

Aspects of non-limiting embodiments of the present disclosure relate to an information processing apparatus and a non-transitory computer readable medium storing a program, in which, regarding an erroneous character recognition result of a type that a character of a character type desired not to be originally written is recognized as a character similar to a character of a character type to be written, it is possible to more appropriately reject the character recognition result in comparison to a method of rejecting the character recognition result in a case where a probability of the character recognition result is incorrect is high.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a first character recognition section that performs character recognition of an input image on an assumption that a character in the input image belongs to a first character type and outputs a first character recognition result being a result of the character recognition, a second character recognition section that performs character recognition of the input image on an assumption that the character in the input image belongs to a second character type and outputs a second character recognition section being a result of the character recognition, the second character type being a set obtained by adding at least one or more characters which do not belong to the first character type to a set of characters belonging to the first character type, and a matching section that performs matching of the first character recognition result with the second character recognition result, and, in a case where it is found that the first character recognition result does not match with the second character recognition result by the matching, rejects the first character recognition result.

BRIEF DESCRIPTION OF THE DRAWINGS

Exemplary embodiment(s) of the present invention will be described in detail based on the following figures, wherein.

DETAILED DESCRIPTION

Figure 1:
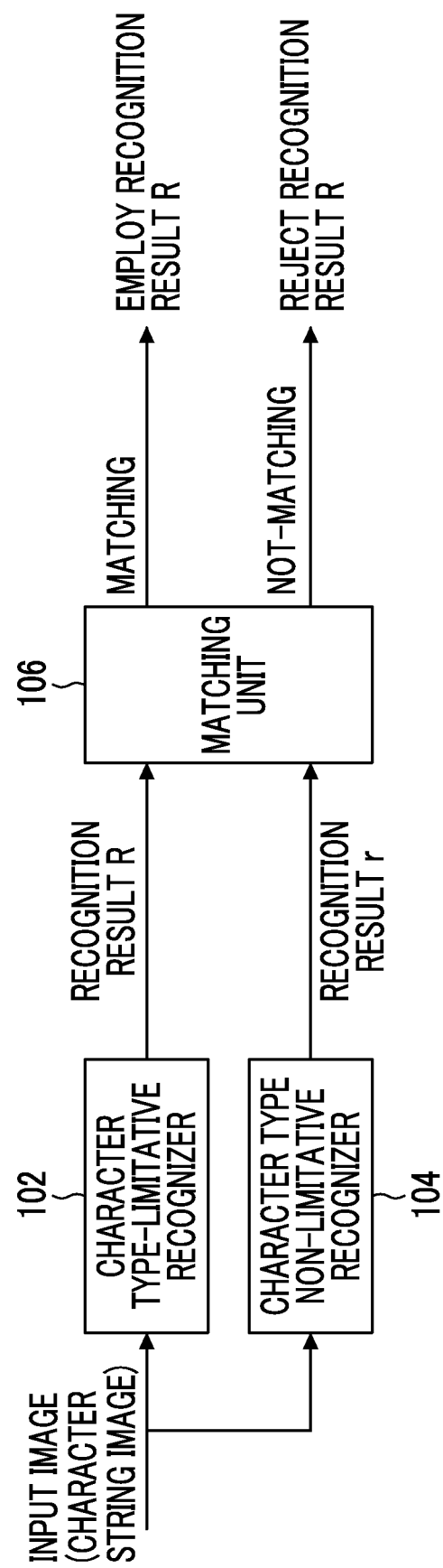
FIG. 1 is a diagram illustrating main components in a configuration of an apparatus according to an exemplary embodiment.

FIG. 1 illustrates a configuration example of an information processing apparatus according to an exemplary embodiment of the present invention.

An input image including an image of a character string is input to the information processing apparatus. The input image is, for example, an image obtained by scanning paper such as a form with a scanner. Alternatively, an image of a region (for example, a specific entry field) including a character string as a recognition target is cutout from an image obtained by scanning paper, and is input to the information processing apparatus as an input image. The character string included in the input image may be a character string constituting a handwritten character, may be a character string of printed types, or may be a character string in which the handwritten character and the printed types are mixed. The character string refers to a string of one or more characters. The character as a target of recognition may include various alphabets, phonograms such as Hiragana and Katakana, ideograms such as kanji, and various marks such as logos.

In the exemplary embodiment, an input image as a target of recognition is an image of an entry field in which it is determined that only a character belonging to a predesignated character type (referred to as a designated character type below) is written. For example, an image obtained by cutting out an entry field of a postal code from an image obtained by scanning a form is an example of an input image.

Here, in the present specification and claims, the character type means a set of characters including a plurality of characters. The term "character type" generally refers to types of characters such as Arabic numbers, Latin alphabets, Cyrillic alphabets, Hiragana, Katakana, Japanese kanji, simplified kanji, and traditional kanji, in many cases. Such types of characters are also included in the concept of the character type in the present specification. For example, a character type of "an Arabic number" (simply referred to as a number below) refers to a set of 10 characters being 0, 1, 2, 3, 4, 5, 6, 7, 8, and 9. A character type of "a Latin alphabet" (simply referred to as an alphabet below) refers to 52 characters being a, b, c, . . . , z, A, B, C, and Z. A set of a plurality of character types may be defined as one character type, for example, alphanumerics (that is, set of numbers, alphabets, and arithmetic symbols). A subset of a certain character type, for example, a set of five numbers being 1, 2, 3, 4, and 5 among 10 numbers maybe defined as a new character type. A set of 12 characters obtained by adding an alphabet A (having a similar letter shape to the letter shape of the number 4) and an alphabet B (having a similar letter shape to the letter shape of the number 8) to the 10 numbers maybe defined as a new character type. As described above, a set of any character may be defined as a character type.

A character type-limitative recognizer 102 and a character type non-limitative recognizer 104 are modules for performing character recognition of an input image using the technique of optical character recognition (OCR) together.

Among the modules, the character type-limitative recognizer 102 performs character recognition on the assumption that a character included in the input image belongs to a designated character type. That is, the character type-limitative recognizer 102 performs character recognition limited to the designated character type, in other words, performs character recognition by setting the designated character type as a recognition target. The character type-limitative recognizer 102 is a basic character recognizer in the information processing apparatus and is an example of "a first character recognition section". The designated character type is an example of "a first character type" being a recognition target of "the first character recognition section". A recognition result R of the character type-limitative recognizer 102 is an example of "a first character recognition result".

For example, the character type-limitative recognizer 102 is a character recognizer that has been learned to recognize a character belonging to the designated character type with high accuracy, by learning samples of various letter shapes (for example, handwritten samples by many people) of each character belonging to the designated character type. As another example, the character type-limitative recognizer 102 may perform character recognition with a recognition dictionary in which a representative letter shape of each character belonging to the designated character type is registered. In this example, regarding a character as a recognition target, which is included in an input image, the character type-limitative recognizer 102 search for a character having a letter shape which is highly similar to the character as the recognition target among characters included in the recognition dictionary. Then, in a case where such a character is found, the character type-limitative recognizer 102 employs the found character as a recognition result of the character as the recognition target. Various character recognizers with limited character types, for example, a character recognizer for a postal code have been developed and used. As the character type-limitative recognizer 102, a known character recognizer corresponding to the designated character type may be used.

The character type non-limitative recognizer 104 is an auxiliary character recognizer that determines misrecognition of the character type-limitative recognizer 102 being the basic character recognizer. The character type non-limitative recognizer 104 is an example of "a second character recognition section". The character type non-limitative recognizer 104 performs character recognition on the assumption that the character included in the input image belongs to a character set which is larger than the designated character type and includes the designated character type. That is, the recognition target of the character type-limitative recognizer 102 is a set of characters belonging to the designated character type, but the recognition target of the character type non-limitative recognizer 104 is a set of characters which include a character group belonging to the designated character type and predetermined one or more characters which do not belong to the designated character type. The character type non-limitative recognizer 104 will be described below in more detail. Here, "the set of characters which include a character group belonging to the designated character type and predetermined one or more characters which do not belong to the designated character type" is an example of "a second character type" being the recognition target of "the second character recognition section". A recognition result r of the character type non-limitative recognizer 104 is an example of "a second character recognition result".

The character type non-limitative recognizer 104 may be configured by a method (for example, learning and using a recognition dictionary) similar to a method of the character type-limitative recognizer 102, so as to be capable of recognizing a character belonging to a set of a character as the recognition target.

The character type-limitative recognizer 102 and the character type non-limitative recognizer 104 may perform character recognition for each character, may perform character recognition in a unit of all character strings included in an input image, or may perform character recognition in a unit of each of one or more character strings extracted from the input image. The character type-limitative recognizer 102 and the character type non-limitative recognizer 104 perform character recognition by using the same character or the same character string in an input image, as a target, and outputs character recognition results obtained as a result to the matching unit 106. The character recognition results of the character type-limitative recognizer 102 and the character type non-limitative recognizer 104 for the same target are described as the recognition result R and the recognition result r, respectively.

The matching unit 106 is an example of "a matching section" and "a first matching section". The matching unit 106 performs matching of the recognition result R of the character type-limitative recognizer 102 with the recognition result r of the character type non-limitative recognizer 104, for the same target. In processing of the matching, it is determined whether or not the recognition results R and r matches (coincides) with each other. A case where the recognition results R and r do not match with each other is referred to as not-matching (that is, discrepancy). The processing of matching by the matching unit 106 may be performed for each character or may be performed for each character string (for example, by setting all character strings of the recognition results R and r as units).

In a case where the recognition results R and r match with each other, the matching unit 106 employs the recognition result R of the character type-limitative recognizer 102 being the basic character recognizer. In a case where the recognition results R and r do not match with each other, the matching unit 106 rejects the recognition result R. Here, "employing the recognition result R" means that that the recognition result R is output as a character recognition result agreed by the character type-limitative recognizer 102 and the character type non-limitative recognizer 104. An output destination in this case may be a file as an output destination of the character recognition result or may be another type of processing at the subsequent stage. "Rejecting the recognition result R" means that the recognition result R is not output as the character recognition result agreed by the character type-limitative recognizer 102 and the character type non-limitative recognizer 104. The concept of "rejecting the recognition result R" includes a case where the recognition result R is discarded without being output, a case where the recognition result R is output in association with information indicating non-agreement (that is, that the recognition results R and r do not match with each other), and the like.

As described above, the character type non-limitative recognizer 104 performs character recognition by using a set of characters, which includes the designated character type and is larger than the designated character type, as the target. It may be assumed that both the character type-limitative recognizer 102 and the character type non-limitative recognizer 104 are capable of recognizing characters belonging to sets of characters, which are respectively used as the recognition targets of the recognizers 102 and 104, at a sufficiently high recognition rate. Thus, in a case where the character as the recognition target belongs to the designated character type, both the character type-limitative recognizer 102 and the character type non-limitative recognizer 104 correctly recognize the character at high probability. Accordingly, the probability that the recognition result R of the character type-limitative recognizer 102 and the recognition result r of the character type non-limitative recognizer 104 match with each other is high. Regarding the reason that the recognition result R and the recognition result r do not match with each other, it is considered that the character type-limitative recognizer 102 misrecognizes a character of a type other than the designated character type allowed to be correctly recognized by the character type non-limitative recognizer 104, as a character of the designated character type in many cases.

For this reason, in the exemplary embodiment, as a result of matching by the matching unit 106, in a case where the recognition result R and the recognition result r match with each other, the recognition result R is employed. In a case of not-matching, the recognition result R is rejected.

Next, a more specific example of the above-described character type non-limitative recognizer 104 will be described.

In one example, the character type non-limitative recognizer 104 performs character recognition without limiting a character type. In other words, limiting the character type means that all assumed characters are recognition targets. That is, in this case, the character type non-limitative recognizer 104 sets a set of all characters assumed as the recognition target by the information processing apparatus in the exemplary embodiment, as the recognition target of character recognition processing. For example, in a case of an information processing apparatus in which numbers, alphabets, and arithmetic symbols, Hiragana, and Katakana are assumed as targets of character recognitions, the character type-limitative recognizer 102 sets a set of characters of some types among the above types of characters, as the recognition targets. However, the character type non-limitative recognizer 104 sets all characters belonging to the numbers, the alphabets, and the arithmetic symbols, Hiragana, and Katakana, as the recognition targets.

In another example, a set of a character set as the recognition target by the character type non-limitative recognizer 104 includes a character which are likely to be misrecognized as any of characters of the designated character type by the character type-limitative recognizer 102. In this example (referred to as a second example below), for example, in a case where the designated character type is the number, a set obtained by adding any of characters other than the numbers, which are likely to be misrecognized as the numbers by the character type-limitative recognizer 102 to the designated character type is set as the recognition target of the character type non-limitative recognizer 104. As a specific example, the alphabet A has a letter shape which is similar to the letter shape of the number 4 to some extents and is likely to be misrecognized as the number 4 by the character type-limitative recognizer 102 that performs recognition on the assumption that the target is a number. Similarly, the alphabet T and q are likely to be misrecognized as the number 7 and 9 by the character type-limitative recognizer 102 in which the recognition target is limited to the numbers, respectively. Thus, a set of 13 characters obtained by adding the alphabets A, T, and q to the 10 numbers may be set as the recognition target of the character type non-limitative recognizer 104. The alphabets A, T, and q have a high probability of being respectively recognized as the numbers 4, 7, and 9 by the character type-limitative recognizer 102 in which the recognition target is limited to the numbers, but have a high probability of being respectively and correctly recognized as the alphabets A, T, and q by the character type non-limitative recognizer 104 configured to also perform character recognition on the alphabets A, T, and q in addition to the numbers. Thus, in the exemplary embodiment, for example, in a case where a character is recognized as the number 4 by the character type-limitative recognizer 102 and is recognized as the alphabet A by the character type non-limitative recognizer 104, the matching unit 106 determines that the recognition results do not match with each other, and thus rejects the number 4 as the recognition result of the character type-limitative recognizer 102.

Among characters of character types other than the designated character type, a character which is likely to be misrecognized as a character belonging to the designated character type by the character type-limitative recognizer 102 is understood from the previous knowledge in many cases. Thus, such a character may be included in a set of characters as the recognition target of the character type non-limitative recognizer 104.

In the above-described second example, the character added as the recognition target of the character type non-limitative recognizer 104 may not be limited to only a character understood that it is likely to be misrecognized as any of characters of the designated character type by the character type-limitative recognizer 102 and may further include other characters. For example, in comparison to the character type-limitative recognizer 102 in which the recognition target is limited to the numbers, all 52 alphabets including the alphabets A, T, and q which are likely to be misrecognized as the numbers maybe provided as the recognition target of the character type non-limitative recognizer 104.

Here, in the second example, a character of a character type other than the designated character type, which is added to the designated character type as the recognition target of the character type non-limitative recognizer 104 maybe limited to a character which is likely to be discriminated and recognized as a character of the designated character type, which has a letter shape similar to the letter shape of the character. For example, the alphabets o and O have a letter shape which is very similar to the letter shape of the number 0. Thus, the alphabets o and O are likely to be misrecognized as the number 0 by a character recognizer in which both the numbers and the alphabets are set as recognition targets, in addition to a character recognizer in which only the numbers are set as recognition targets. Accordingly, even though the character type non-limitative recognizer 104 is set to have a configuration of including both the numbers and the alphabets in comparison to the character type-limitative recognizer 102 in which the recognition target is limited to the number, the character type non-limitative recognizer 104 misrecognizes the alphabet o or O as the number 0 in many cases. In particular, in a case of a handwritten character, such a discrimination is difficult. As described above, a character which is in the limited character type as the recognition target and has a difficulty in being discriminated and recognized does not contribute to detection of misrecognition of the character type-limitative recognizer 102 even the character is added to the recognition target of the character type non-limitative recognizer 104. Thus, it is effective that such a character is not included in the recognition target of the character type non-limitative recognizer 104.

On the contrary, the alphabets A, T, and q described above have letter shapes similar to the letter shapes of the number 4, 7, and 9 to some extents, respectively. However, in a case where a character recognizer capable of recognizing the alphabet is provided, the probability that the alphabets A, T, and q are respectively misrecognized as the number 4, 7, and 9 is low. Thus, in a case where the alphabet A, T, or q is included in the recognition target of the character type non-limitative recognizer 104, and the character type-limitative recognizer 102 misrecognizes the alphabets A, T, and q as the number 4, 7, and 9, such an inclusion helps detection of the misrecognition.

Figure 2:
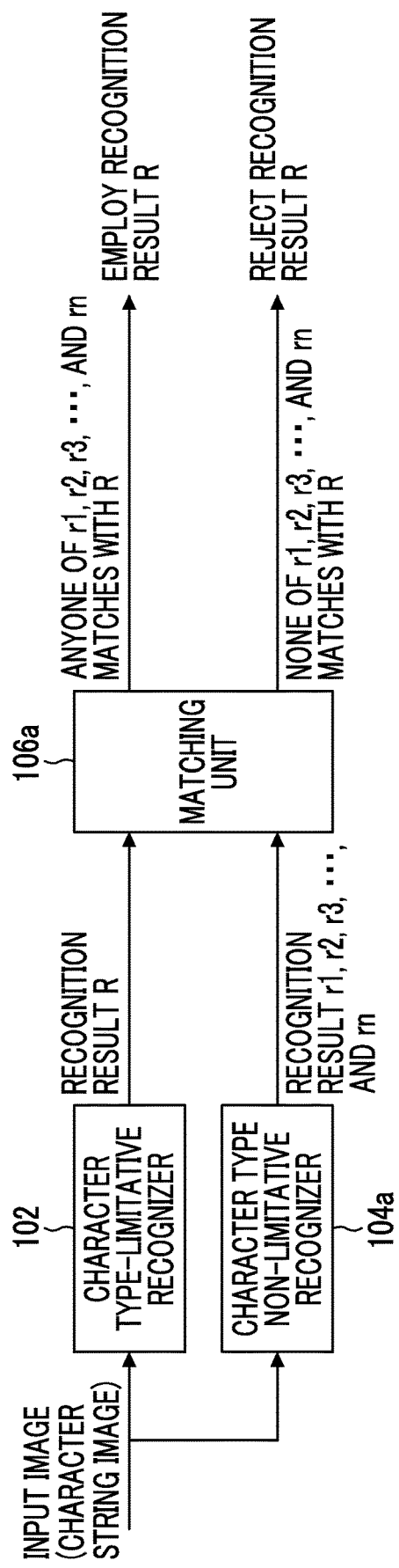
FIG. 2 is a diagram illustrating main components in a first modification example.

Next, a first modification example in the exemplary embodiment will be described with reference to FIG. 2. In FIG. 2, elements having the same functions as the functions of the elements of the apparatus illustrated in FIG. 1 are denoted by the same reference signs, and elements having similar functions are denoted by reference signs obtained by adding a suffix "a" to the same reference signs.

A character type non-limitative recognizer 104a recognizes a character as the same recognition target as the recognition target of the character type non-limitative recognizer 104 in the exemplary embodiment in FIG. 1. However, the character type non-limitative recognizer 104a is different from the character type non-limitative recognizer 104 in that the character type non-limitative recognizer 104a outputs a plurality of recognition results r1, r2, r3, . . . , and rn (n is an integer of 2 or more).

Generally, the character recognizer outputs a candidate character or a candidate character string having the highest similarity (in other words, highest certainty) to a character or a character string as the recognition target among plurality of candidate characters, as the recognition result. Among character recognizer, a character recognizer that presents a candidate character or a candidate character string which has the second or third similarity (or certainty) to the character or the character string as the recognition target, as the next candidate and the third candidate. Here, the certainty P is a degree indicating indubitability that the recognition result R obtained in a manner that the character recognizer performs character recognition of the input image correctly represents the character string included in the input image. As the certainty increases, the probability that the text code of the recognition result is correct increases.

The character type non-limitative recognizer 104a outputs not only a candidate character or a candidate character string having the highest similarity (or certainty) but also candidate characters or candidate character strings having the second, third, . . . , and n-th similarities together, as the character recognition result of the input image. For example, a recognition result rk (k is an integer of 1 to n) refers to a candidate character or a candidate character string having the k-th similarity (or certainty).

The matching unit 106a matches the recognition result R of the character type-limitative recognizer 102 with each of the recognition results r1, r2, r3, . . . , and rn of the character type non-limitative recognizer 104a. In a case where any of the recognition results r1, r2, r3, . . . , and rn matches with the recognition result R, the matching unit 106a sets a result of the matching to be "matching" and employs the recognition result R of the character type-limitative recognizer 102. In a case where none of the recognition results r1, r2, r3, . . . , and rn matches with the recognition result R, the matching unit 106a sets the result of the matching to be "not-matching" and rejects the recognition result R of the character type-limitative recognizer 102.

The character type non-limitative recognizer 104 in the example in FIG. 1 includes a character of the designated character type in the set of the character as the recognition target. However, when the character type non-limitative recognizer 104 recognizes a character belonging to the designated character type, the character does not correspond to a character recognition result having the highest similarity or certainty. Instead, a character which does not belong to the designated character type and is similar to the character may correspond to the highest character recognition result. For example, in a case where the character type-limitative recognizer 102 in which the target is limited to the number recognizes the number 1, the recognition result R corresponds to the number 1. However, in a case where the character type non-limitative recognizer 104 recognizes a character with including the numbers and alphabets in the recognition target, the alphabet l (that is, the lower case of L) may exceed the number 1 in similarity or certainty, and thus, the alphabet l may be output as the recognition result r. In this case, although the character type non-limitative recognizer 104 internally considers the number 1 as a candidate for the recognition result, the character type non-limitative recognizer 104 does not transfer this consideration to the matching unit 106. As a result, the matching unit 106 matches the number 1 as the recognition result R with the alphabet l as the recognition result r, and, as a result, rejects the number 1 as the recognition result R. As described above, as in the example in FIG. 1, in a case where the character type non-limitative recognizer 104 outputs only one recognition result r, a lack of recognition in which, although the recognition result R of the character type-limitative recognizer 102 is obtained by correctly recognizing a character belonging to the designated character type, the recognition result R is rejected may occur.

On the contrary, in the modification example illustrated in FIG. 2, not only the highest recognition result r1 but also a plurality of recognition results rk up to the n-th class match with the recognition result R of the character type-limitative recognizer 102. Thus, as described above, the lack of recognition occurs less frequently in comparison to the example in FIG. 1.

It may not be necessarily that the character type non-limitative recognizer 104a outputs a predetermined number of recognition results rn. Instead, the character type non-limitative recognizer 104a may output only one or more recognition results rk in which the similarity or certainty is equal to or greater than a threshold. The threshold is predetermined.

Next, a second modification example in the exemplary embodiment will be described with reference to FIG. 3. In FIG. 2, elements having the same function as the functions of the elements in the apparatus illustrated in FIG. 1 or FIG. 3 are denoted by the same reference signs.

Figure 3:
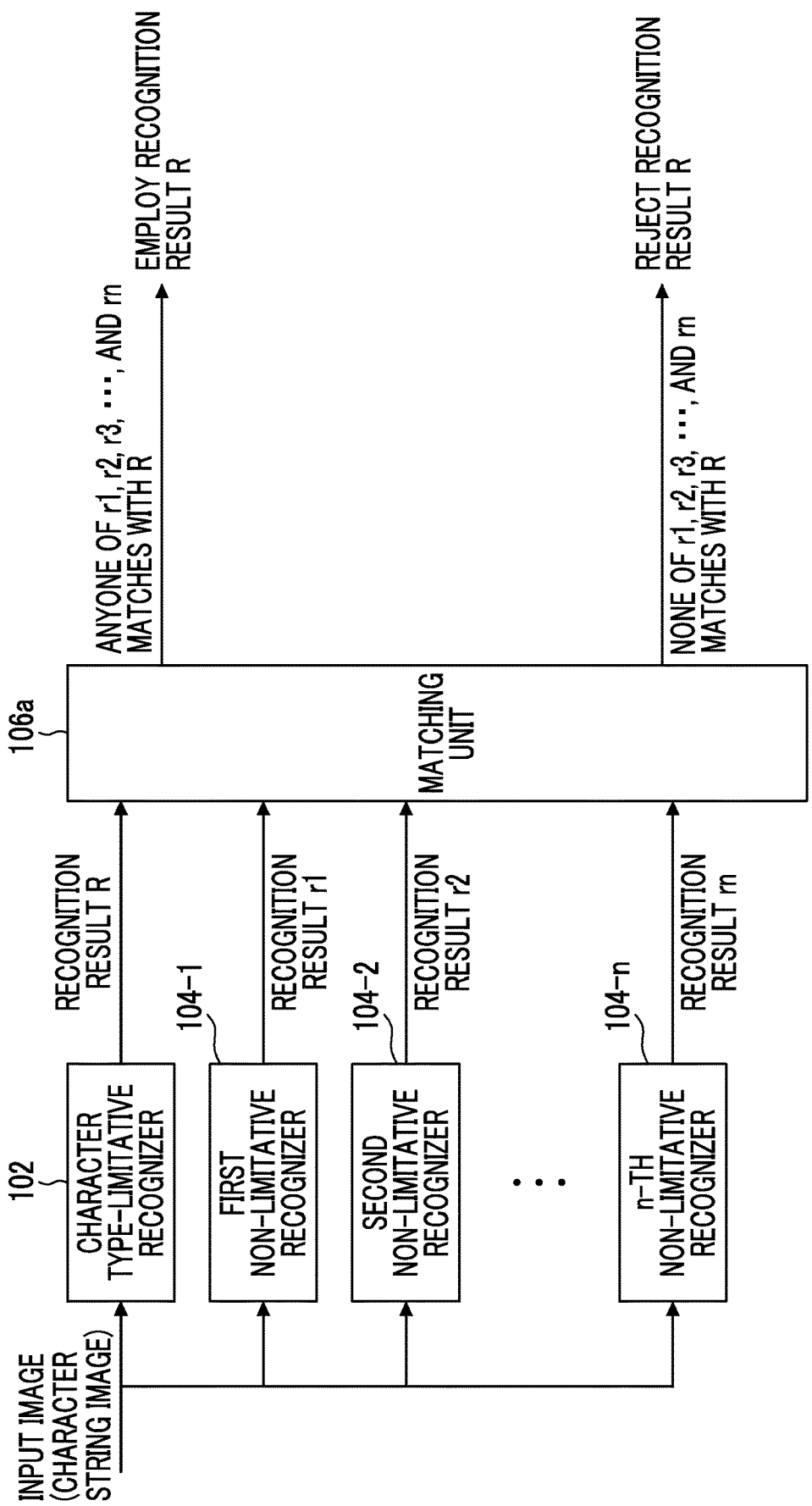
FIG. 3 is a diagram illustrating main components in a second modification example.

The apparatus in FIG. 1 includes the single character type non-limitative recognizer 104, but an apparatus in FIG. 3 includes n pieces (n is an integer of 2 or more) of k-th non-limitative recognizer 104-k (k is an integer of 1 to n), which are a first k-th non-limitative recognizer 104-k to an n-th k-th non-limitative recognizer 104-k. Similar to the character type non-limitative recognizer 104, each of the k-th non-limitative recognizers 104-k performs character recognition processing in which a set of characters of the designated character type and a character type other than the designated character type is set as the recognition target. A subset of characters of the character type other than the designated character type, which are included in the set of characters as the recognition target differs for each of the k-th non-limitative recognizers 104-k. For example, in a case where the character type-limitative recognizer 102 performs character recognition processing in which the character type is limited to the numbers, the first non-limitative recognizer 104-1 sets the numbers and the alphabets as recognition targets, the second non-limitative recognizer 104-2 sets the numbers, alphabets, and the Katakana as recognition targets, and the third non-limitative recognizer 104-3 sets the numbers and the arithmetic symbols as recognition targets. A set of characters of the character type other than the designated character type among the recognition targets may include or may not include a common character between the k-th non-limitative recognizers 104-k (k is different from each other).

One of the k-th non-limitative recognizers 104-k is an example of "a second character recognition section", and other one or more k-th non-limitative recognizers 104-k are examples of "a third character recognition section".

The recognition results r1, r2, r3, . . . , and rn of the k-th non-limitative recognizers 104-k are input to the matching unit 106a. The matching unit 106a matches the recognition result R of the character type-limitative recognizer 102 with each of the recognition results r1, r2, r3, . . . , and rn of the k-th non-limitative recognizers 104-k. In a case where any of the recognition results r1, r2, r3, . . . , and rn matches with the recognition result R, the matching unit 106a sets a result of the matching to be "matching" and employs the recognition result R of the character type-limitative recognizer 102. In a case where none of the recognition results r1, r2, r3, . . . , and rn matches with the recognition result R, the matching unit 106*a* sets the result of the matching to be "not-matching" and rejects the recognition result R of the character type-limitative recognizer 102.

A single character type non-limitative recognizer in which all characters as recognition targets of the n pieces of k-th non-limitative recognizers 104-*k* are set as recognition targets is assumed. The single character type non-limitative recognizer is capable of recognizing all the recognition targets of the n pieces of k-th non-limitative recognizers 104-*k*. However, recognition accuracy is deteriorated by the number of characters as the recognition targets, in comparison to each of the k-th non-limitative recognizers 104-*k*. Therefore, in a case of the k-th non-limitative recognizer 104-*k*, even in a case where the k-th non-limitative recognizer 104-*k* is capable of correctly recognizing a character of a character type other than the designated character type, which is set as the recognition target by the k-th non-limitative recognizer 104-*k*, it is not possible that the single character type non-limitative recognizer correctly recognizes the character. For example, there is a possibility that the single character type non-limitative recognizer misrecognizes the above character as a character of a character type other than the designated character type, which is similar to the character. Thus, using the n pieces of k-th non-limitative recognizers 104-*k* as in this modification example rather than using such a single character type non-limitative recognizer is expected to improve ability of detecting misrecognition (that is, misrecognition in which a character of a character type other than the designated character type is recognized as a character of the designated character type) of the character type-limitative recognizer 102.

Next, a third modification example in the exemplary embodiment will be described with reference to FIG. 4. The third modification example is obtained by adding components for processing at the subsequent stage of the matching unit 106 to the apparatus in the exemplary embodiment in FIG. 1. As understood from the following descriptions, the configuration of the third modification example may be also applied to the first and second modification examples illustrated in FIGS. 2 and 3.

An information processing apparatus in the third modification example includes a recognition control unit 108, a key input unit 14, and a second matching unit 16 in addition to the element group illustrated in FIG. 1.

In the third modification example, the character type-limitative recognizer 102 the recognition result R on the input image and certainty P of the recognition result R to the matching unit 106. The certainty P is a degree indicating indubitability that the recognition result R obtained by the character type-limitative recognizer 102 correctly represents the character string included in the input image. As the certainty P increases, the probability that the character code of the recognition result R is correct (that is, the character string in the input image is correctly represented) increases.

Similar to the example in FIG. 1, the character type non-limitative recognizer 104 outputs the recognition result r on the input image to the matching unit 106.

The matching unit 106 performs matching of the recognition result R with the recognition result r and outputs a result of the matching, that is, information indicating whether or not the recognition results match with each other, to the recognition control unit 108. The matching unit 106 outputs the recognition result R and the certainty P received from the character type-limitative recognizer 102 to the recognition control unit 108.

The recognition control unit 108 performs control for obtaining a final character recognition result for the input image based on the result of the matching input from the matching unit 106, the recognition result R, and the certainty P. Control performed by the recognition control unit 108 will be described below.

In the related art, an information processing apparatus that outputs a recognition result R as a final character recognition result of the information processing apparatus in a case where the certainty P of the recognition result R of the character recognizer on an input image is higher than a threshold T1 is provided. In a case where the certainty P is equal to or smaller than the threshold T1, this type of information processing apparatus receives an input of a character recognition result on the same input image from a person and matches the received input with the recognition result R. In this matching, in a case where it is determined that both the recognition results match with (that is, coincide with) each other, the recognition result R is output as the final character recognition result of the information processing apparatus. In this matching, in a case where it is determined that both the recognition results do not match with each other, the information processing apparatus in the related art receives an input of a character recognition result of the same input image from another person and obtains the final character recognition result in consideration of the input character recognition result. In one example, a character recognition result of the first person and a new character recognition result of another person, which is input in this time match with each other. In a case where both the character recognition results coincide with each other, the character recognition result is set as the final character recognition result.

On the contrary, in the exemplary embodiment, even though the certainty P of a recognition result R of the character type-limitative recognizer 102 on an input image is higher than the threshold T1, the recognition control unit 108 does not set the recognition result R as the final character recognition result of the information processing apparatus only by using a point that the certainty P is higher than the threshold T1. Instead of this, the recognition control unit 108 further uses the result of the matching. Thus, in a case where the certainty P is higher than the threshold T1, and the result of the matching indicates matching, the recognition control unit 108 outputs the recognition result R as the final character recognition result of the information processing apparatus.

In a case where the result of the matching indicates not-matching, even though the certainty P is higher than the threshold T1, the recognition control unit 108 does not employ the recognition result R as the final character recognition result. This is because, in a case of the not-matching, the recognition result R of the character type-limitative recognizer 102 has a high probability of misrecognizing a character of a character type other than the designated character type as a character of the designated character type. In this case, the recognition control unit 108 inputs the recognition result R to the second matching unit 16. The second matching unit 16 matches the input recognition result R with a character recognition result on the input image, which is input to a key input unit 14 by a person (in FIG. 1, a person having a name of "A"). The second matching unit 16 is an example of "a second matching section". The key input unit 14 is a software module that receives a key input from a user (person), and is an example of "a receiving section". A terminal of the person named "A" may be connected to the information processing apparatus illustrated in FIG. 1 via the Internet, for example. In this case, a mechanism of displaying an input image or receiving an input of a recognition result on the input image is provided to the terminal from the key input unit 14 in a form of a web service, for example. The person named "A" recognizes the input image displayed in the terminal and inputs a character string indicated by the input image with a keyboard of the terminal. The key input unit 14 receives character string data input by the person named "A" from the terminal and transfers the character string data to the second matching unit 16.

In a case where the certainty P is equal to or smaller than the threshold T1, similar to the above-described method in the related art, the recognition control unit 108 transfers the recognition result R to the second matching unit 16 and causes the recognition result R to match with a character recognition result by a person.

As described above, in the exemplary embodiment, in a case where the result of matching by the matching unit 106 indicates not-matching, matching of the recognition result R of the character type-limitative recognizer 102 with the character recognition result by the person is also performed, in addition to a case where the certainty P is equal to or smaller than the threshold T1. In a case where the result of matching by the matching unit 106 indicates not-matching, the recognition result R of the character type-limitative recognizer 102 has a high probability of misrecognition, but is not necessarily misrecognized. As a result of that the recognition result R of the character type-limitative recognizer 102 is correct, but the character type non-limitative recognizer 104 causes misrecognition, the result of matching by the matching unit 106 may indicate not-matching. In the modification example, considering such a case, the second matching unit 16 matches the recognition result with the input of the person. In a case of the person, a probability that the person misrecognizes a character of a character type other than the designated character type as a character of the designated character type is low. Thus, in a case where the matching result of the matching unit 106 indicates not-matching regardless of that the recognition result R of the character type-limitative recognizer 102 is correct, it is found that the recognition result R of the character type-limitative recognizer 102 is correct by matching with the recognition result of the person.

That is, in a case where the recognition result R of the character type-limitative recognizer 102 matches with the character recognition result of the person, which is input to the key input unit 14, the second matching unit 16 outputs the recognition result R to the final character recognition result of the information processing apparatus. In a case where the matching result by the second matching unit 16 indicates not-matching, an input of a character recognition result on the input image from a person other than the person named "A" is received, and the final character recognition result of the information processing apparatus is obtained by using the received input. A specific example of processing on a case where the matching result indicates not-matching will be described with reference to FIGS. 5 and 6.

In a case where the result of matching by the matching unit 106 indicates not-matching, the recognition result R of the character type-limitative recognizer 102 has a high probability of misrecognition. Thus, a method of discarding the recognition result R without being output to the subsequent stage is also considered. However, in this method, in a case where the result of the matching indicates not-matching, the final recognition result depends only one the character recognition result of the person. In this case, it is considered that the input itself of the person named "A" from the key input unit 14 is employed as the final character recognition result of the information processing apparatus. However, since the person often makes mistakes, in many cases, it is determined that reliability is not sufficient only by a recognition result of one person. Thus, in order to improve the reliability, it is considered that character recognition results of two or more persons match with each other, and the final character recognition result is obtained based on the result of the matching. However, engaging two or more persons increases the cost.

On the contrary, in the exemplary embodiment, in a case where the result of the matching by the matching unit 106 indicates not-matching, the recognition result R of the character type-limitative recognizer 102 is matched with the character recognition result of the person named "A" being the person for the second matching unit 16. In a case where both the recognition results match with each other, the recognition result R is employed as the final recognition result. The final recognition result in this case is obtained by two independent recognition results matching with each other. Thus, reliability is higher than a case only using the character recognition result of the person named "A". As a result of the matching by the second matching unit 16, in a case where the recognition result R of the character type-limitative recognizer 102 matches with the character recognition result of the person named "A", the input of the second person is not necessary. Thus, required cost is reduced in comparison to a method of necessarily performing matching between inputs of two or more persons in a case where the result of the matching by the matching unit 106 indicates not-matching.

Next, an example of a configuration of processing in a case where the matching result by the second matching unit 16 indicates not-matching will be described with reference to FIG. 5. In FIG. 5, similar elements to the elements illustrated in FIG. 4 are denoted by the same reference signs, and descriptions thereof will not be repeated.

Figure 4:
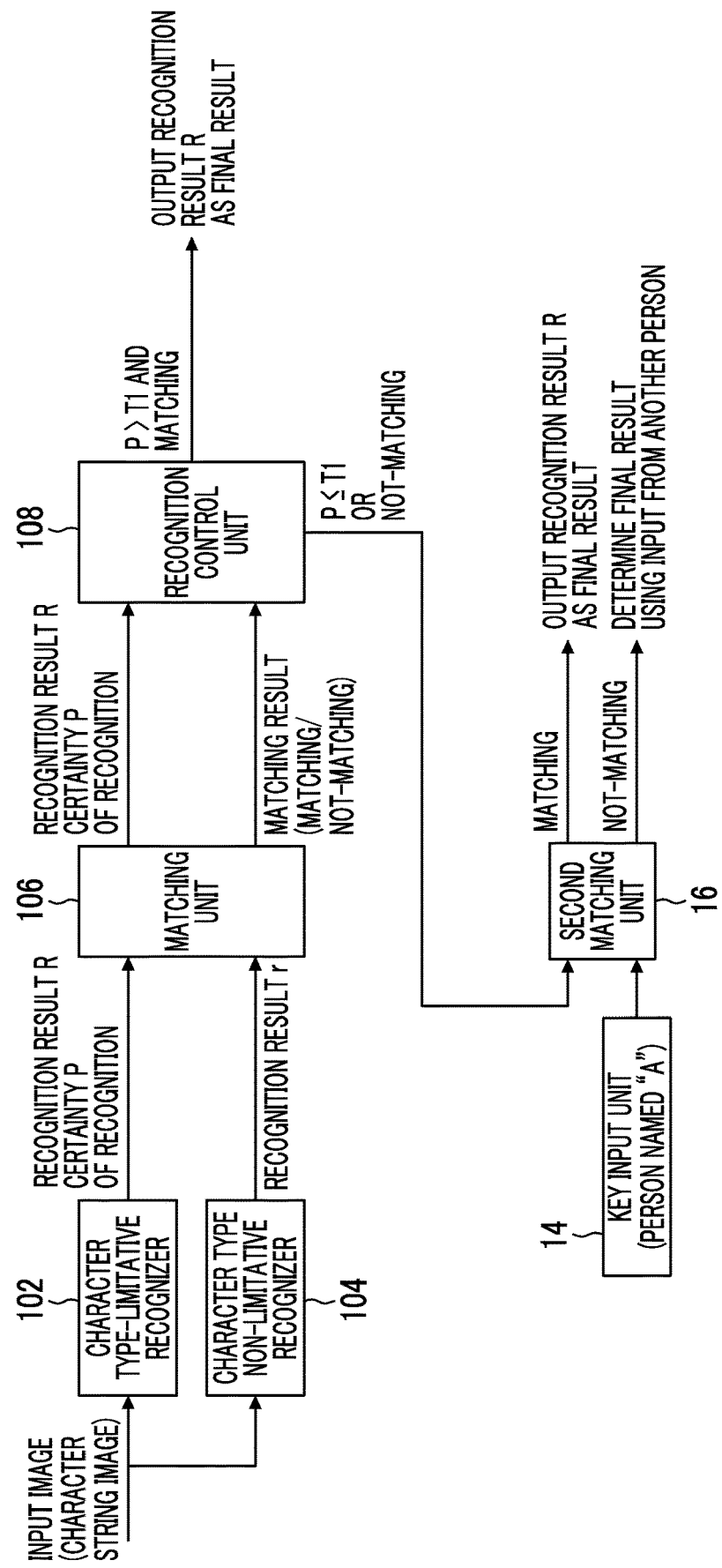
FIG. 4 is a diagram illustrating main components in a third modification example.
Figure 5:
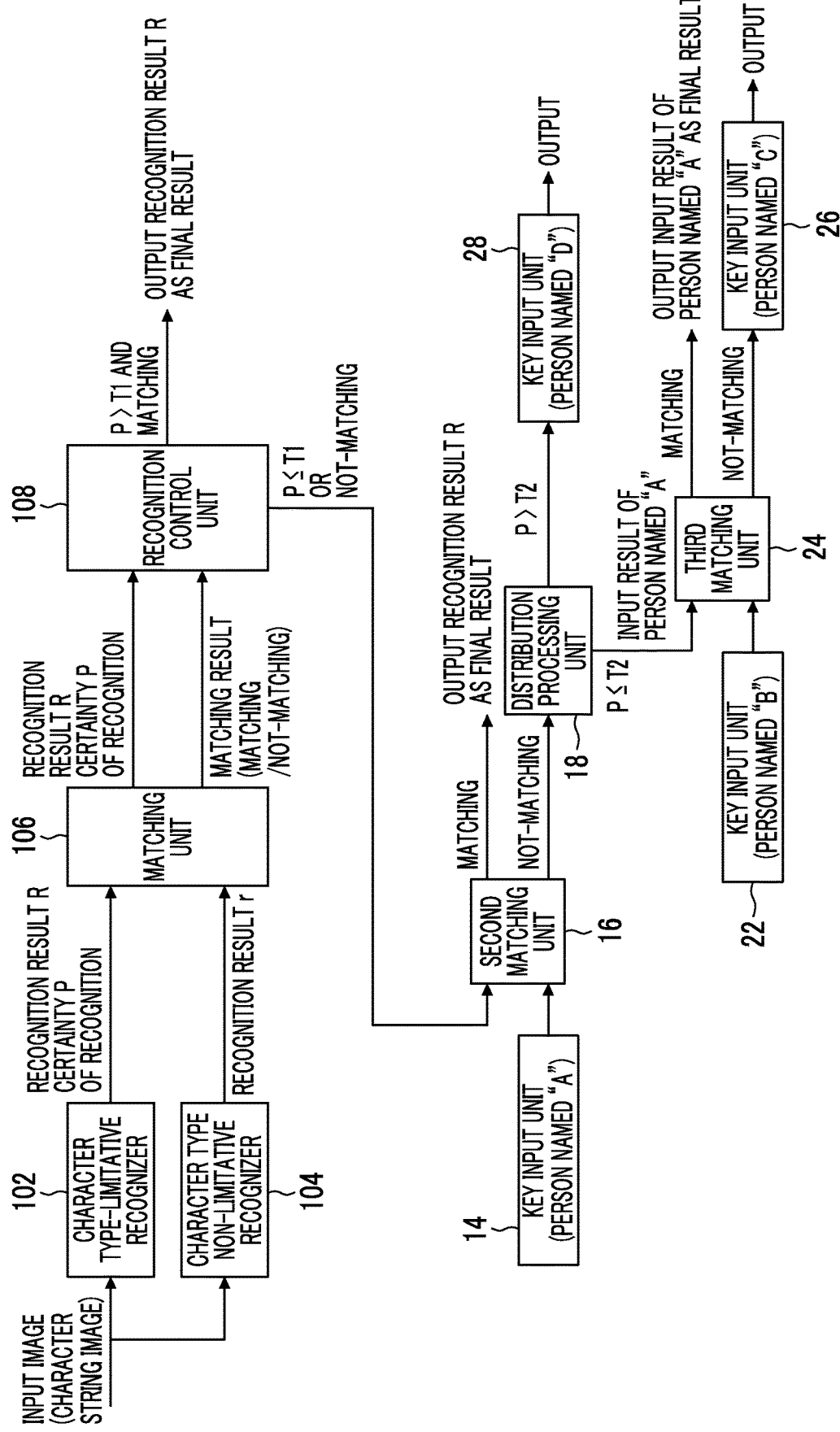
FIG. 5 is a diagram illustrating a configuration of processing in a case where a matching result of a second matching unit indicates not-matching, in the third modification example.

The information processing apparatus illustrated in FIG. 5 further includes a key input unit 22, a third matching unit 24, and a key input unit 26 in addition to the element group of the information processing apparatus illustrated in FIG. 4.

The key input unit 22 receives an input of a character recognition result of the input image from a person named "B", which is different from the person named "A". The third matching unit 24 matches the input of the person named "A", which is input from the second matching unit 16, and the input of the person named "B", which is input from the key input unit 22. The key input unit 26 receives an input of a character recognition result of the input image from a person named "C", which is different from the person named "A" and the person named "B".

In the example in FIG. 5, in a case where a matching result of the recognition result R of the character type-limitative recognizer 102 with the character recognition result of the person named "A" indicates not-matching, the second matching unit 16 inputs the character recognition result of the person named "A" to the third matching unit 24. In this case, the key input unit 22 provides the input image to a terminal of the person named "B", and inputs the character recognition result which is input by the person named "B" in response to the providing, to the third matching unit 24. The third matching unit 24 matches the character recognition result of the person named "A" with the character recognition result of the person named "B". In a case where both the character recognition results match with each other, the third matching unit 24 outputs the matched character recognition result as the final character recognition result of the information processing apparatus. In a case where the result of the matching indicates not-matching, the third matching unit 24 operates the key input unit 26. The key input unit 26 provides the input image to a terminal of the person named "C", receives an input of the character recognition result from the person named "C" in response to the providing, and employs the character recognition result as the final character recognition result. Since a person who has a higher accuracy rate of the previously input character recognition result than those of the person named "A and the person named "B" is employed as the person named "C", the accuracy of the final character recognition result is secured to some extent.

Figure 6:
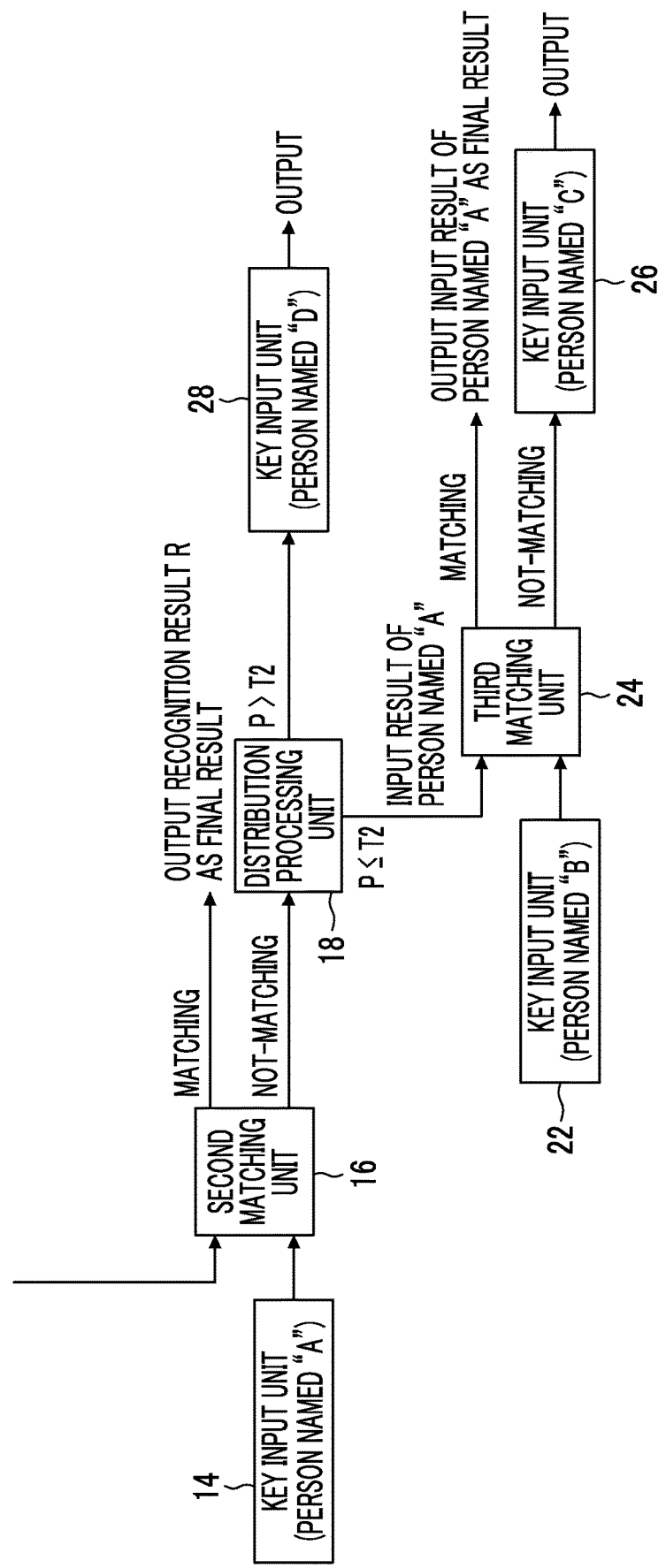
FIG. 6 is a diagram illustrating another configuration of the processing in a case where the matching result of the second matching unit indicates not-matching, in the third modification example.

Next, another example of the configuration of processing in a case where the matching result by the second matching unit 16 indicates not-matching will be described with reference to FIG. 6. FIG. 6 illustrates components handling processing subsequent to matching processing by the second matching unit in the configuration of the information processing apparatus.

In the example in FIG. 6, in a case where the matching result by the second matching unit 16 indicates not-matching, the second matching unit 16 requests distribution of the processing by transferring an input image as a recognition target in this time, input data of the person named "A" on the input image, and the certainty P to a distribution processing unit 18.

In a case where the certainty P is greater than a preset threshold T2 (T2<T1), the distribution processing unit 18 transfers the input image to the key input unit 28. The key input unit 28 provides the input image to a pre-registered terminal of a person named "D", receives the character recognition result input by the person named "D" in response to the providing, and outputs the character recognition result as the final recognition result on the input image. Here, the person named "D" may be different from the person named "A".

In a case where the certainty P is equal to or smaller than the threshold T2, the distribution processing unit 18 transfers the input image to the key input unit 22 and transfers input data of the person named "A" to the third matching unit 24. The key input unit 22 provides the input image to the pre-registered terminal of the person named "B", receives the character recognition result input by the person named "B" in response to the providing, and transfers the character recognition result to the third matching unit 24. The third matching unit 24 matches the character recognition result of the person named "A" with the character recognition result of the person named "B". In a case where both the character recognition results match with each other, the third matching unit 24 outputs the matched character recognition result as the final character recognition result on the input image. In a case where both the character recognition results do not match with each other in matching of the third matching unit 24, the key input unit 26 provides the input image to the terminal of the person named "C" different from the person named "A" and the person named "B", receives the character recognition result input by the person named "C" in response to the providing, and outputs the character recognition result as the final recognition result.

Figure 7:
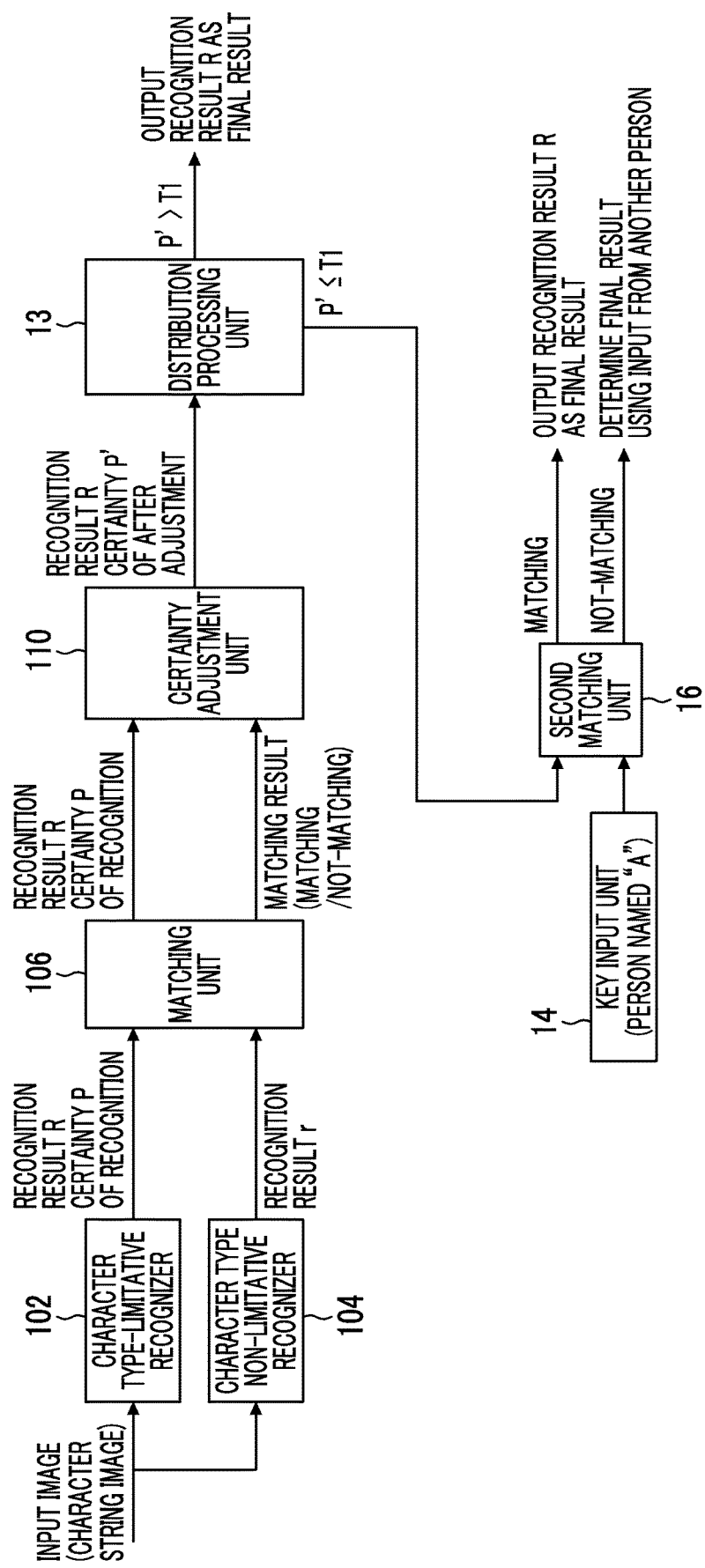
FIG. 7 is a diagram illustrating main components in another configuration of an apparatus corresponding to the third modification example.

Next, a fourth modification example in the exemplary embodiment will be described with reference to FIG. 7. In FIG. 7, similar elements to those in the configuration in FIG. 4 are denoted by the same reference signs, and descriptions thereof will not be repeated.

The configuration in FIG. 7 is obtained by replacing the recognition control unit 108 in the configuration in FIG. 4 with a certainty adjustment unit 110 and a distribution processing unit 13.

The certainty adjustment unit 110 receives the result of matching, the recognition result R, and the certainty P from the matching unit 106. In a case where the result of the matching indicates not-matching, the certainty adjustment unit 110 adjusts the certainty P to have a value smaller than the threshold T1 and then outputs the certainty P to the distribution processing unit 13. In a case where the strike-through is not detected from the input image, the certainty adjustment unit 110 outputs the received certainty P to the distribution processing unit 13 without being changed. The value of the certainty output by the certainty adjustment unit 110 is expressed by certainty P'.

The distribution processing unit 13 controls the subsequent processing path in accordance with the certainty P' input from the certainty adjustment unit 110. More specifically, in a case where the certainty P' is greater than the threshold T1, the distribution processing unit 13 outputs the recognition result R of the character type-limitative recognizer 102 as the final character recognition result of the information processing apparatus. In a case where the certainty P' is equal to or smaller than the threshold T1, the distribution processing unit 13 outputs the recognition result R and the certainty P' to the second matching unit 16. Processing performed by the second matching unit 16 is similar to that in a case of the exemplary embodiment in FIG. 4. The configuration illustrated in FIG. 5 or 6 may be employed as a processing configuration in a case where the matching result of the second matching unit 16 indicates not-matching.

In one example, the above-described information processing apparatus in the exemplary embodiment may be configured in a form of a logic circuit of hardware. As another example, the information processing apparatus in the exemplary embodiment may be realized by causing a built-in computer to execute a program. The program represents each functional module in the system or the apparatus. Here, for example, the computer has a circuit configuration in which a processor such as a CPU, a memory (primary storage) such as a random access memory (RAM) and a read only memory (ROM), an HDD controller, various input and output (I/O) interfaces, and a network interface are connected to each other via a bus. The HDD controller controls a hard disk drive (HDD). The network interface performs control for connections with a network such as a local area network. A disk drive, a memory reader and writer and the like may be connected to the bus via the I/O interface. The disk drive is used for performing reading or writing from or in a portable disk recording media such as a CD and a DVD. The memory reader and writer is used for performing reading or writing from or in portable non-volatile recording media of various standards, such as a flash memory. The above-described program in which processing contents of each functional module are described is stored in a fixed storage device such as a hard disk drive via a recording medium such as a CD or a DVD or via a communication section such as a network, and then is installed on the computer. The above-described functional module group is realized in a manner that the program stored in the fixed storage device is read out to the RAM and is executed by the processor such as a CPU. The information processing apparatus in the embodiment may be configured by a combination of software and hardware.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a first character recognition section that performs character recognition of an input image on an assumption that a character in the input image belongs to a first character type and outputs a first character recognition result being a result of the character recognition;
a second character recognition section that performs character recognition of the input image on an assumption that the character in the input image belongs to a second character type and outputs a second character recognition result being a result of the character recognition, the second character type being a set obtained by adding at least one or more characters which do not belong to the first character type to a set of characters belonging to the first character type; and
a matching section that performs matching of the first character recognition result with the second character recognition result, and, in a case where it is found that the first character recognition result does not match with the second character recognition result by the matching, rejects the first character recognition result.

2. The information processing apparatus according to claim 1,
wherein the second character recognition section outputs a plurality of second character recognition results different from each other, for one input image,
the matching section matches each of the plurality of second character recognition results different from each other with the first character recognition result, and, in a case where it is found that all the plurality of second character recognition results different from each other do not match with the first character recognition result by the matching, rejects the first character recognition result.

3. The information processing apparatus according to claim 1, further comprising:
a third character recognition section that performs character recognition of the input image on an assumption that the character in the input image belongs to a third character type and outputs a third character recognition result being a result of the character recognition, the third character type being a set obtained by adding at least one or more characters which do not belong to the first character type and the second character type to a set of characters belonging to the first character type,
wherein the matching section performs matching of the first character recognition result with the second character recognition result and matching of the first character recognition result with the third character recognition result, and, in a case where it is found that the first character recognition result does not match with any of the second character recognition result and the third character recognition result by the matching, rejects the first character recognition result.

4. An information processing apparatus comprising:
a first character recognition section that performs character recognition of an input image on an assumption that a character in the input image belongs to a first character type, and outputs a first character recognition result being a result of the character recognition and certainty of the first character recognition result;
a second character recognition section that performs character recognition of the input image on an assumption that the character in the input image belongs to a second character type and outputs a second character recognition result being a result of the character recognition, the second character type being a set obtained by adding at least one or more characters which do not belong to the first character type to a set of characters belonging to the first character type; and
a receiving section that receives an input of the character recognition result of the input image by a person;
a first matching section that performs matching of the first character recognition result with the second character recognition result;
a section that, in a case where it is found that the first character recognition result matches with the second character recognition result by the matching of the first matching section and the certainty is equal to or greater than a threshold, outputs the first character recognition result as a final character recognition result on the input image; and
a second matching section that, in a case where it is found that the first character recognition result does not match with the second character recognition result by the matching of the first matching section or the certainty is smaller than the threshold, performs matching of the first character recognition result with the character recognition result received by the receiving section by the person, and obtains and outputs the final character recognition result based on a result of the matching.

5. A non-transitory computer readable medium storing a program causing a computer to function as:
a first character recognition section that performs character recognition of an input image on an assumption that a character in the input image belongs to a first character type and outputs a first character recognition result being a result of the character recognition;
a second character recognition section that performs character recognition of the input image on an assumption that the character in the input image belongs to a second character type and outputs a second character recognition result being a result of the character recognition, the second character type being a set obtained by adding at least one or more characters which do not belong to the first character type to a set of characters belonging to the first character type; and
a matching section that performs matching of the first character recognition result with the second character recognition result, and, in a case where it is found that the first character recognition result does not match with the second character recognition result by the matching, rejects the first character recognition result.

* * * * *